Patented Oct. 23, 1928.

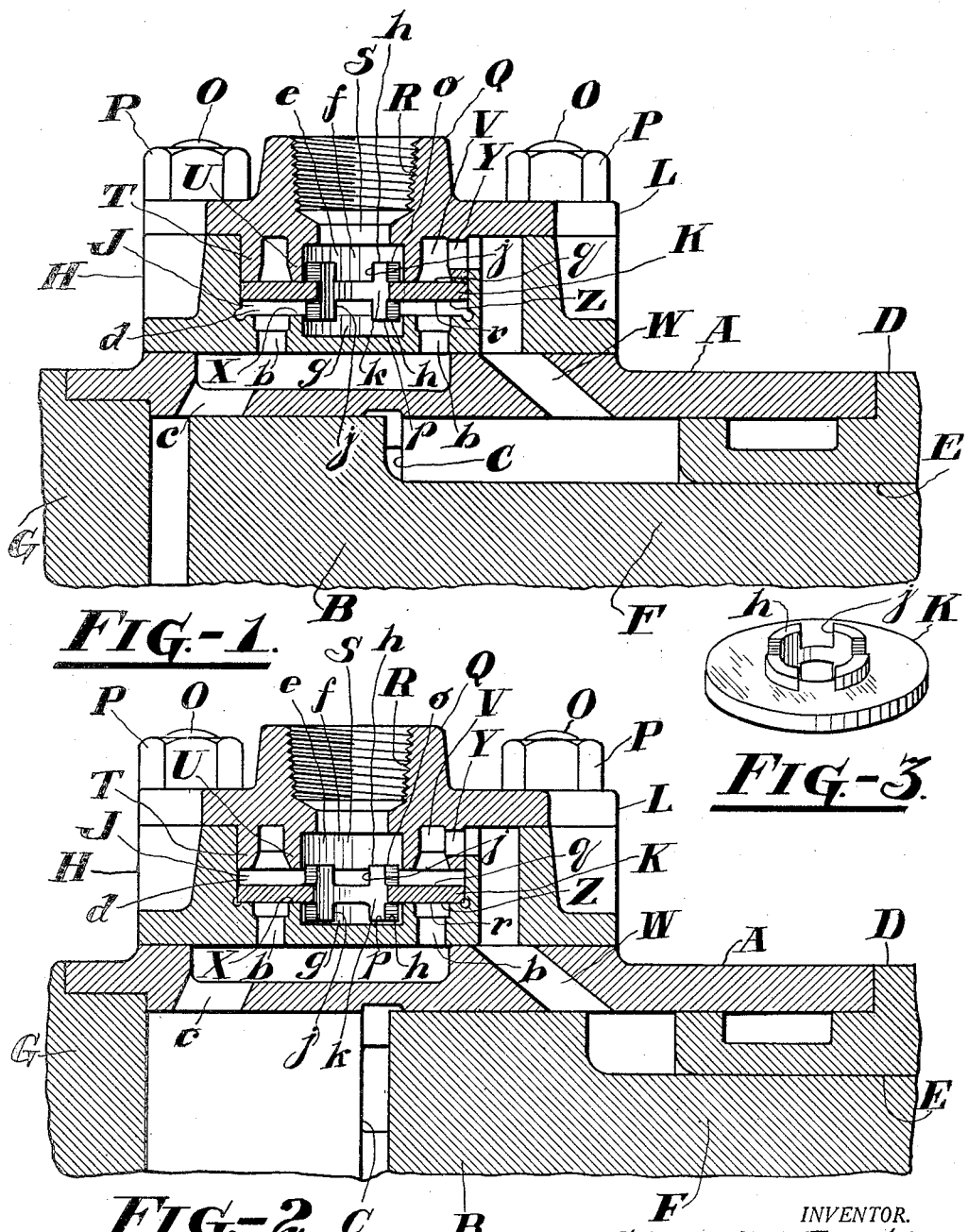

1,688,633

UNITED STATES PATENT OFFICE.

GEORGE W. HULSHIZER, OF STEWARTSVILLE, NEW JERSEY, ASSIGNOR TO INGERSOLL-RAND COMPANY, OF JERSEY CITY, NEW JERSEY, A CORPORATION OF NEW JERSEY.

VALVE FOR ROCK DRILLS.

Application filed August 18, 1927. Serial No. 213,814.

This invention relates to rock drills, but more particularly to distributing valves for fluid actuated rock drills of the hammer type.

One object of the present invention is to produce a distributing valve of light weight capable of positive and rapid action in its function of distributing the pressure fluid to the ends of the cylinder.

Other objects will appear hereinafter, and to all of these ends the invention consists of the features of construction and arrangement of parts having the general mode of operation substantially as hereinafter described and claimed and illustrated in the accompanying drawings, in which Figure 1 is a longitudinal sectional elevation of so much of a rock drill as will serve to illustrate the invention, Figure 2 is a view similar to Figure 1 showing the reciprocatory parts in another position, and Figure 3 is a perspective view of the valve.

Referring to the drawings, the invention is shown embodied in a rock drill having a cylinder A in which is arranged a reciprocatory hammer piston B for delivering blows on a drill steel (not shown) but which may project into the front end of a drill motor and extend into the path of the hammer piston in a well known manner.

The cylinder A in this instance is provided with a free exhaust port C suitably located in the side of the cylinder and controlled by the piston B.

At the front end of the cylinder A is located a front cylinder washer D which partly extends into the cylinder and is provided with a bore E to receive and guide a forward reduced extension F of the piston B. The rearward end of the cylinder A may be sealed in any suitable manner. In the drawings, a back cylinder plate G is indicated for this purpose.

Of the parts so far described those forming the casing of the drill, such as the cylinder A, the washer D and the plate G, may be held in operative position with respect to each other in any suitable manner. The means whereby this is accomplished preferably consists of the usual side bolts (not shown).

In accordance with the present invention, means are provided for effecting the distribution of pressure fluid to the ends of the cylinder for reciprocating the piston B. These means comprise in this instance a valve chest H disposed on the side of the cylinder A and bored to form a valve chamber J in which is disposed a distributing valve designated by K. A plate L forms a cover for the valve chest H and said plate L, together with the valve chest H, may be secured to the cylinder A by means of stud bolts O having nuts P threaded thereon.

On the outer side of the plate L is provided a boss Q having a threaded aperture R for connection with a hose or pipe (not shown) leading from a source of pressure fluid supply. At the inner end of the threaded aperture R is formed a port S to afford communication between the threaded aperture R and the valve chamber J.

In order to suitably centralize the plate L with respect to the valve chamber J, said place L carries at its inner side an annular flange T which cooperates slidably with the wall of the valve chamber J and extends into said chamber J to form a stop for limiting the upward or outward travel of the valve K.

Formed concentrically with the flange T is a smaller flange U spaced from the flange T to form an annular passageway V which communicates with a front inlet passage W through a port Y. The flanges T and U are preferably of the same length in order to form ample seating area for a flange Z of the valve K. The position of the free ends of the flanges T and U with respect to the end wall X of the valve chamber J determines the length of travel of the valve, the end wall X in this instance serving the same function as the end surfaces of the flanges T and U, that is as a seating surface for the inner or lowermost surface of the flange Z of the valve.

In order to insure an ample supply of pressure fluid to the cylinder A, a plurality of ports $b$ are formed in the valve chest H beneath the valve K to communicate with a rearward inlet passage $c$ leading to the rearward end of the cylinder A.

The valve chamber J in this instance comprises an enlarged portion $d$ in which lies the flange Z of the valve, and a central reduced portion $e$ consisting of bores $f$ and $g$ in the plate L and the valve chest H respectively.

The bores $f$ and $g$ are preferably of the same diameter and of a depth somewhat in excess of the length of lugs $h$ on opposite sides of the flange Z for which they form a guide. The lugs h are preferably so located and proportioned as to leave suitable spaces j between adjacent lugs for the passage of pressure fluid through said spaces to the inlet passages W and c. In the present instance the valve K is provided with a central aperture k to insure a constant supply of pressure fluid to central end areas o and p of the valve.

The outer end surfaces of the flange Z constitute actuating surfaces q and r against which compression from the front and rearward ends respectively of the cylinder may act for actuating the valve.

The operation of the valve, briefly described, is a follows: With the valve and piston in the position illustrated in Figure 1, pressure fluid entering the valve chamber J will flow through the operture k in the valve, the spaces j between the lugs h, thence through the ports b and the inlet passage c into the rearward end of the cylinder A to impel the piston B forwardly. After the piston B overruns the free exhaust port C, the air in the front end of the cylinder A will be compressed and, flowing through the channels affording communication between the front end of the cylinder and the upper actuating surface q of the valve, will act against the said actuating surface so that when the piston B uncovers the exhaust port C at the instant of delivery of the blow against the drill steel, the valve K will be thrown downwardly to the position illustrated in Figure 2 and thus cut off any further flow of pressure fluid to the rearward end of the cylinder.

Upon reversal of the valve, pressure fluid will flow between the upper lugs h into the annular space V, thence through the port Y and the inlet passage W to the front end of the cylinder to reverse the travel of the piston. During the rearward stroke, as during the forward stroke of the piston, air in the rearward end of the cylinder will, of course, also be compressed by the piston and such compression acting against the actuating surface r will at the proper period in the cycle of operations, throw the valve K to its initial position wherein it will be held by the force of the pressure fluid flowing beneath the actuating surface r into the rearward end of the cylinder.

I claim:

1. In a fluid actuated rock drill, the combination of a cylinder and piston, a valve chest having a valve chamber, inlet passages leading from the ends of the valve chamber to the cylinder, a hollow distributing valve in the valve chamber controlling the inlet passages, guide lugs on the ends of the valve between which pressure fluid passes to the inlet passages and having opposed end areas constantly exposed to pressure fluid, and opposed actuating surfaces on the valve intermittently exposed to compression from the cylinder for actuating the valve.

2. In a fluid actuated rock drill, the combination of a cylinder and piston, a valve chest having a valve chamber, inlet passages leading from the ends of the valve chamber to the cylinder, a hollow distributing valve controlling the admission of pressure fluid into the inlet passages, lugs on the valve for guiding said valve and having end areas constantly exposed to pressure fluid, and a flange on the valve having opposed actuating surfaces intermittently exposed to compression from the cylinder for actuating the valve.

3. In a fluid actuated rock drill, the combination of a cylinder and piston, a valve chest having a valve chamber, inlet passages leading from the ends of the valve chamber to the cylinder, a hollow distributing valve controlling the admission of pressure fluid into the inlet passages, lugs on opposite sides of the valve for guiding said valve, said lugs being spaced with respect to each other to permit the passage of pressure fluid therebetween to the inlet passages, opposed inner end areas on the valve constantly exposed to pressure fluid, and opposed outer actuating surfaces on the valve intermittently exposed to compression from the cylinder for actuating the valve.

In testimony whereof I have signed this specification.

GEORGE W. HULSHIZER.